United States Patent [19]
Brown et al.

[11] 3,961,468
[45] June 8, 1976

[54] HEDGER

[75] Inventors: Philip A. Brown; Vincent B. Brown, both of Conklin, Mich.

[73] Assignee: Harlo Products Corporation, Grandville, Mich.

[22] Filed: Dec. 21, 1973

[21] Appl. No.: 427,091

[52] U.S. Cl. .................................. 56/237; 30/380
[51] Int. Cl.² ..................................... A01D 55/00
[58] Field of Search ............................ 56/233–237, 56/244, 245, 290–292; 74/230.01, 230.16; 301/16; 83/818, 819, 820, 4; 30/380, 371, 373

[56] References Cited
UNITED STATES PATENTS

| | | | |
|---|---|---|---|
| 2,082,610 | 6/1937 | Bankson | 56/237 |
| 2,483,772 | 10/1949 | Homes | 56/11.2 |
| 2,926,480 | 3/1960 | Kimball | 56/235 |
| 2,940,486 | 6/1960 | Whitmore | 56/237 X |
| 3,246,460 | 4/1966 | Patterson et al. | 56/235 |
| 3,433,005 | 3/1969 | Deigaard et al. | 56/235 |
| 3,530,908 | 9/1970 | Crow | 30/380 |
| 3,545,188 | 12/1970 | Locati | 56/245 |
| 3,605,392 | 9/1971 | Fossum | 56/237 |

FOREIGN PATENTS OR APPLICATIONS

| | | | |
|---|---|---|---|
| 693,714 | 7/1953 | United Kingdom | 56/233 |

*Primary Examiner*—Russel R. Kinsey
*Attorney, Agent, or Firm*—Price, Heneveld, Huizenga & Cooper

[57] ABSTRACT

An apparatus for trimming trees, hedges, and the like including a cutting arm supported in a centilevered fashion from an upstanding tower. The cutting arm includes flexible, resilient, drive and idler wheels rotatably mounting a continuous, band-type saw blade. As the blade is rotated in a closed path, it cuts and transports the trimmings toward a guard on the arm which causes them to be deposited in a row adjacent the path of travel of the apparatus. Means are included for moving the cutting arm vertically along the tower and for pivoting and rotating the arm in order to selectively position the height and angle of the cutting blade.

27 Claims, 9 Drawing Figures

HEDGER

This invention relates to devices for trimming or hedging trees, hedges, shrubbery, and the like, and, more particularly, to a trimming apparatus including a vertically adjustable, pivotable, and rotatable cutting arm including a continuous, band-type saw blade specifically adapted to trim the tops and sides and other generally less accessible portions of such trees and hedges.

BACKGROUND OF THE INVENTION

In the past, several devices for trimming and hedging fruit trees and other tall trees and plants have been developed. Generally, these devices have included a cutting arm which is vertically movable in order to reach various portions of the trees to be trimmed. Some of the prior devices have included cutting arms which are also pivotable with respect to arm supporting means to further enable cutting of other portions of the tree. Many types of blades and saws have been included in such devices. U.S. Pat. No. 3,597,908, for example, issued on Aug. 10, 1971, to W. A. Schaefer and entitled TREE-PRUNING APPARATUS, includes a rectilinear arm having reciprocating cutting blades. U.S. Pat. No. 2,940,486 issued on June 14, 1960, to J. F. Whitmore and entitled PRUNING APPARATUS, includes a cutting arm having a plurality or gang of spaced, rotating, circular saw blades to provide the cutting action. Such prior devices have suffered from several disadvantages.

First, the prior-known trimming devices have generally been unable to smoothly and evenly cut and hedge the tree branches and other foliage. Especially with fruit trees, such rough and uneven cutting can result in severe injury to the tree thereby stunting either its growth or fruit production.

Secondly, the previously known trimming devices have either cut and dropped the branches and other foliage at the exact point where they were growing on the trees or caused the trimmings to be scattered and distributed over a wide area because of their own mechanical motion. As will be appreciated, this has caused great difficulty and expense in removing the trimmings and cuttings after such an operation.

Further, such prior known devices have been less useful for extremely large trees. Because of the bulk and mass of the mechanical elements required to produce the cutting action on such devices, the cutting arms thereon have been relatively short in order to maintain the supporting structure of the trimming apparatus at a reasonable size. Because of such considerations, it has been difficult to reach the tops and other more inaccessible areas of larger trees with such prior devices.

Also, several of the prior devices have included mechanical means for producing the cutting action of the various blades which limit the overall maneuverability and adaptability of the cutting arm. Thus, it has often been a problem to position the cutting arms on such prior devices in order to cut between the trees, around bottoms of trees, or in various positions in the top hemisphere of a tree.

Accordingly, there has been a need in the fruit and tree growing industry for a trimming apparatus which is highly maneuverable and therefore able to reach all areas of a tree, includes an effective, relatively lightweight cutting apparatus which will trim branches and foliage smoothly and evenly without injury to the tree, and yet which will not scatter the cuttings and trimmings over a wide area or leave the same on the viable tree foliage.

SUMMARY OF THE INVENTION

Therefore, it is an object and purpose of the present invention to provide a trimming and hedging apparatus for fruit trees and the like which includes a highly maneuverable cutting arm which is able to smoothly and evenly cut branches and other foliage of even the most sensitive trees without injury to those trees. The cutting arm may be raised and lowered vertically, pivoted generally in a vertical plane which lies transverse to the general direction of motion in which the apparatus is pulled or moved, and rotated generally about its own longitudinal axis. The cutting edge of the cutting apparatus may therefore be positioned very accurately such that virtually all areas of even the tallest tree may be easily reached. Further, the cutting apparatus is adapted to draw the cuttings and trimmings toward the apparatus where they are deposited in a neat row adjacent the path of travel of the trimming apparatus.

The apparatus includes a trimming means or cutting arm having a support member, flexible, resilient, circular, rotatable pulley means, and a continuous, band-type saw blade mounted on said pulley means. Drive means are included to drive the saw blade in a closed path about the pulley means. The trimming means itself is supported above the surface of the ground on suitable support structure and includes apparatus for changing and varying the position of the saw blade in order to reach various areas of a tree or hedge to be trimmed.

The present invention provides significant advantages over the prior-known devices. The cutting arm is relatively lightweight and highly maneuverable. It is therefore positionable such that virtually all areas of a tree may be easily trimmed. The cutting arm includes a highly reliable and effective band-type saw blade which smoothly and evenly cuts even the most sensitive trees without injury. Further, the cuttings and trimmings removed from the trees are deposited alongside the path of travel of the apparatus making their recovery and cleanup very easy and inexpensive.

These and other objects, advantages, purposes, and features of the invention will become more apparent from a study of the following description taken in conjunction with the drawings.

DESCRIPTION OF THE PREFERRED EMBODIMENT

Figure 1:
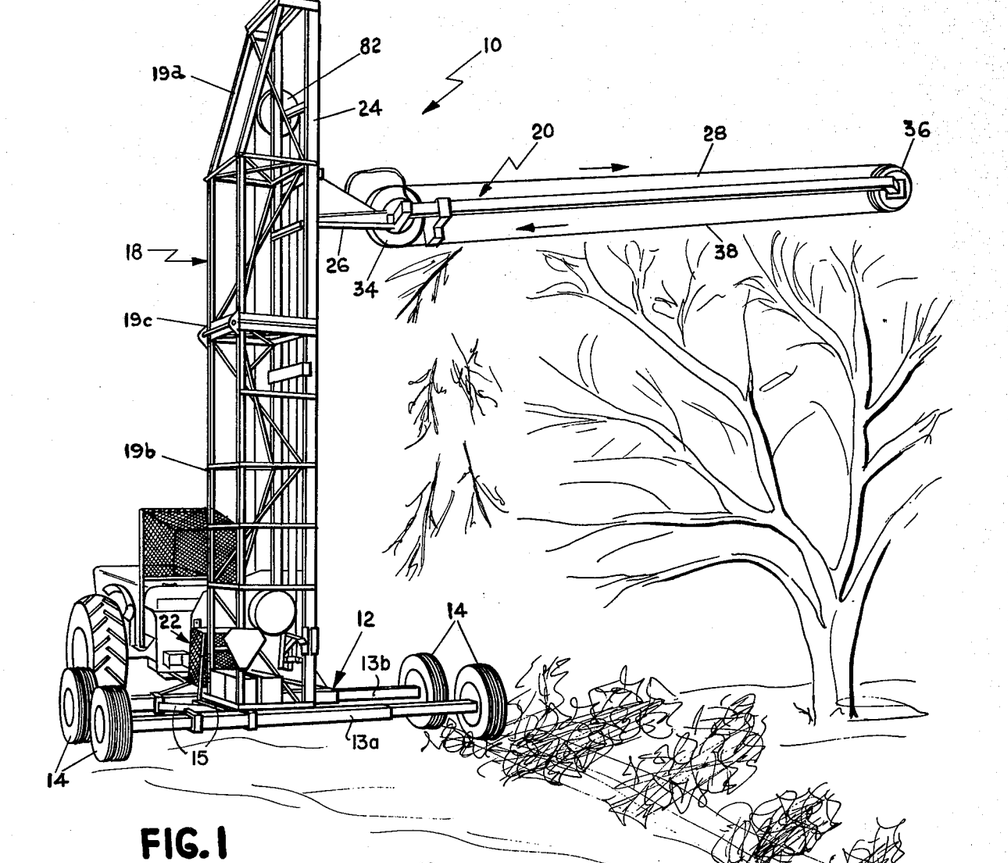
FIG. 1 is a perspective view of the trimming apparatus of the present invention illustrated during the trimming of a tree.
Figure 2:
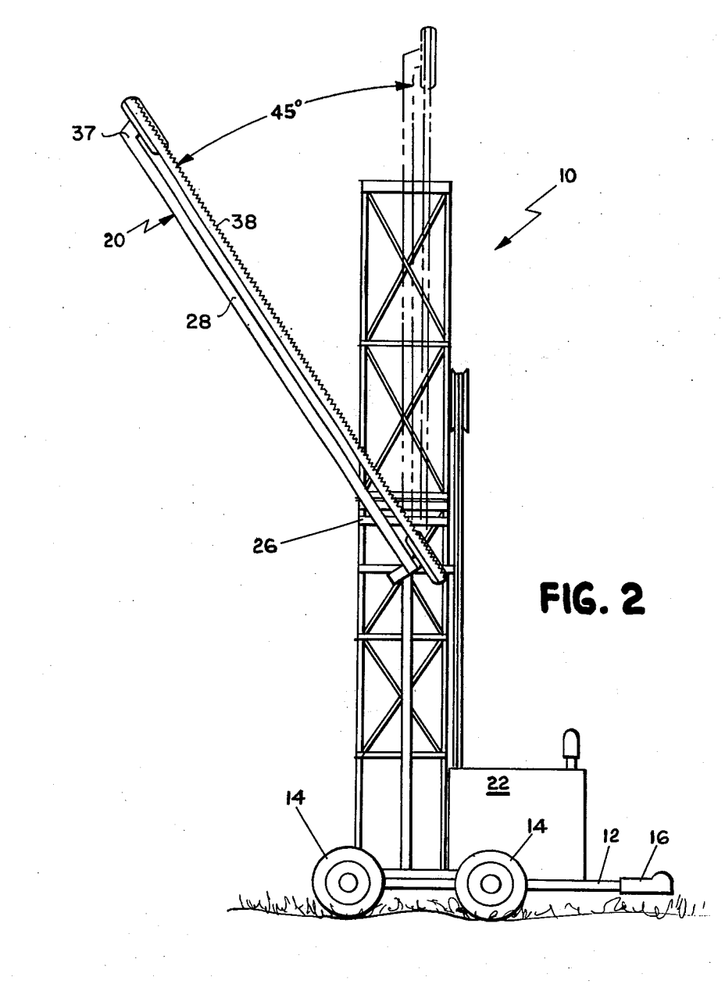
FIG. 2 is a side elevation of the trimming apparatus shown in FIG. 1.
Figure 3:
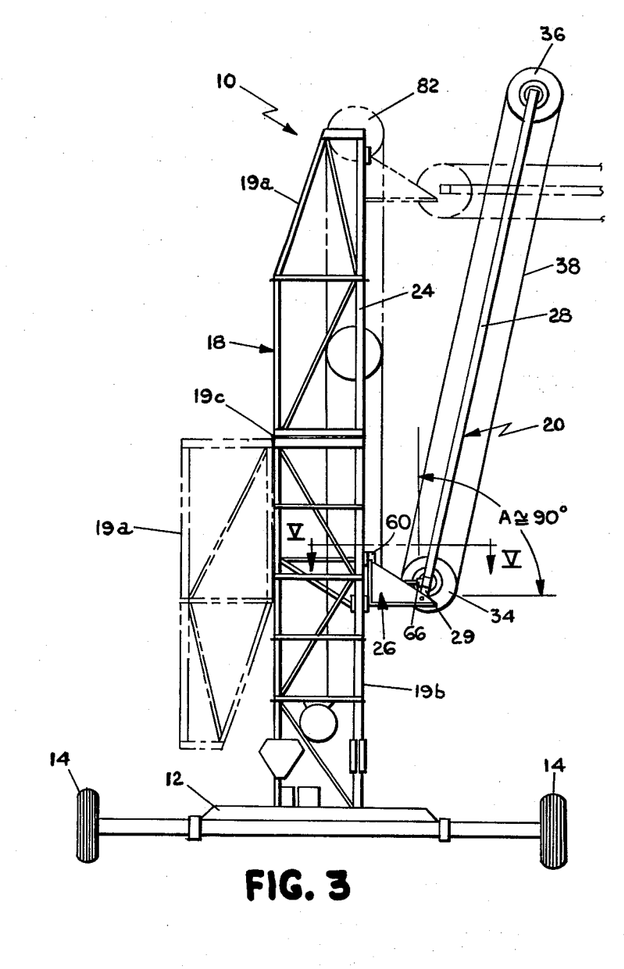
FIG. 3 is a rear elevation of the trimming apparatus shown in FIGS. 1 and 2.

Referring now to the drawings in greater detail, FIGS. 1–3 illustrate the trimming apparatus 10 of the present invention including a horizontal supporting framework 12 having axles and wheels 14 which allow it to be pulled forwardly over the ground by a tractor or the like. A hitch 16 on the front of the apparatus is provided for this purpose. The framework 12 supports a generally upstanding tower 18 supported in a generally vertical, upright fashion from and rigidly secured to cross members 15 extending between axle members 13a and 13b (FIGS. 1 and 6), the tower in turn supporting in a cantilevered fashion a cutting arm 20. The framework 12 also supports a hydraulic pump and engine 22 for actuating the cutting arm. As will be more fully explained below, the cutting arm may be moved vertically along the lateral side 24 of the tower 18, extending outwardly away from the tower, and rotated about a horizontal axis in order to position the cutting blade.

As shown in FIGS. 1–5, the tower 18 is generally rectangular in cross section and includes a side 24 which is generally parallel to the direction of motion in which the apparatus 10 is normally pulled but faces laterally of that direction. Tower 18 includes upper portion 19a and lower portion 19b hinged together at 19c. Accordingly, the upper portion 19a may be rotated to its folded position shown in FIGS. 3 and 4 for storage or transportation under power lines or the like. When the tower is in its erect position, tower portions 19a and 19b are generally coaxial with one another such that all of their sides including side 24 are generally flush and coplanar.

Figure 5:
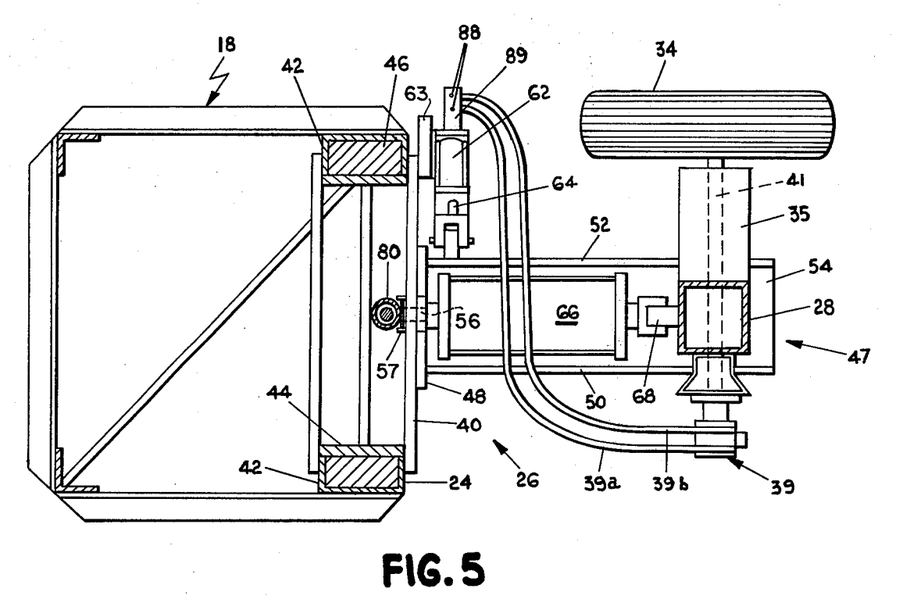
FIG. 5 is an enlarged sectional, plan view of the tower and cutting arm taken along plane IV—IV of FIG. 3.
Figure 6:
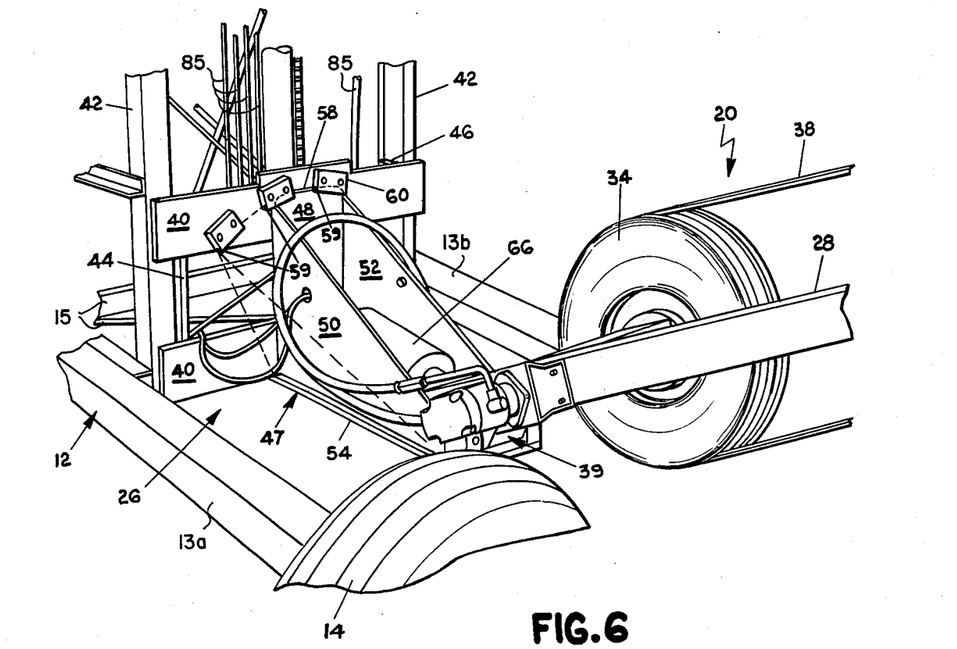
FIG. 6 is an enlarged fragmentary, perspective view of the frame securing the cutting arm to the tower, the cutting arm being shown at the bottom of the tower.

A cantilever support member 26 is mounted for sliding movement on side 24 and supports the cutting arm 20 therefrom in a cantilevered fashion. Arm 20 includes a generally rectilinear support member 28. Rotatably mounted at either end of the support 28 are flexible, resilient drive and idler wheels 34 and 36, respectively. Wheels 34 and 36 are mounted on suitable axles in axle members 35 and 37 (FIGS. 2, 5, and 7), respectively, which extend generally perpendicularly from the support arm 28 in order to space the wheels and blades from support 28 toward the front of the apparatus. As shown in FIGS. 5 and 6, a hydraulic motor or rotary actuator 39 is mounted opposite drive wheel 34 to provide rotational power for wheel 34 and blade 38. Motor 39 is powered by hydraulic fluid transmitted from engine and pump 22 via hydraulic lines 39a and 39b. A connecting axle 41 (FIG. 5), supported in suitable bearings, transmits rotational power to wheel 34.

A continuous, band-type, saw blade, having a width of approximately 1 to 3 inches, is mounted in a closed path around the outer circumferences of the wheels 34 and 36 which serve as pulleys supporting the blade. As will be seen in FIGS. 7–8, the cutting teeth on this blade are located along the forward edge of the blade, i.e., the edge which extends toward the intended direction of motion of the apparatus 10. The resiliency of the wheels 34 and 36 allows both the wheels and the band-type saw blade to flex slightly during cutting to prevent fracturing or breakage of the blade. Typically, the blade is made from a highly durable, wear-resistant, flexible steel which retains its sharpness on the cutting teeth for a long period. The blade is preferably of an alloy of intermediate hardness having hook teeth and as much set (amount teeth are offset from plane of blade) as possible. Typical dimensions for a suitable blade are 1¼ inch wide by 0.035 inch thick with ¾ inch tooth spacing. The length of the blade corresponds to the length of the path or distance around wheels 34 and 36.

Figure 7:
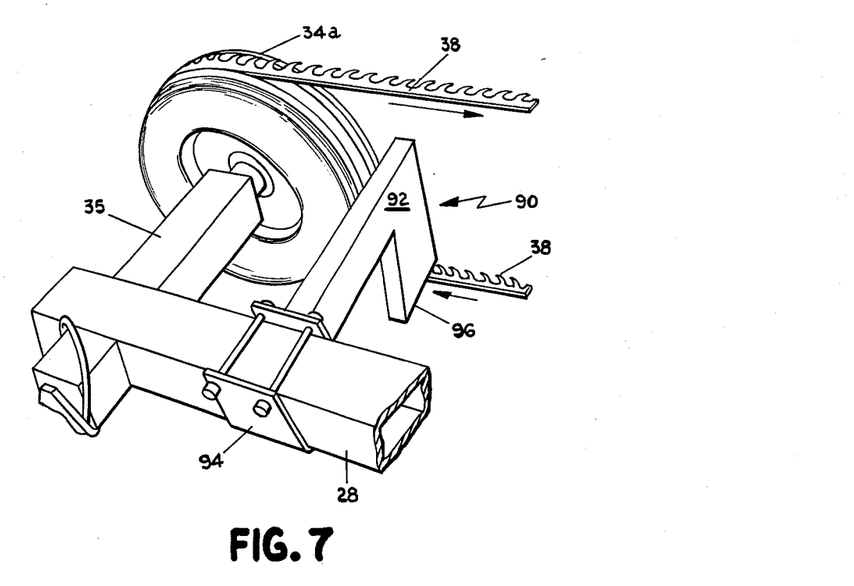
FIG. 7 is an enlarged fragmentary, perspective view of one embodiment of the drive wheel of the trimming apparatus including the guard means adjacent thereto for depositing the cuttings in a row.

Referring to FIG. 7, one form of the flexible resilient wheels 34 and 36 is shown including a tire 34a filled with air or another gas or fluid. Tire 34a is similar to the normal automobile tire, is mounted on a conventional wheel or rim, and includes a plurality of spaced, annular treads extending around its outer circumference. The cutting arm includes tires such as 34a located in both the drive and idler positions 34 and 36, respectively, with the band-type saw blade 38 being automatically centered on the tires as the blade is rotated by the hydraulic motor 39. Although the physical principle of why the blade remains centered on such tires during rotation and any cutting operations is not precisely understood, it has been verified through repeated tests that the blade does remain so centered on such tires. Preferred tire pressure with air is approximately 35 pounds per square inch.

As shown in FIGS. 1 and 7, guard means 90 may be utilized with the flexible, resilient, fluid-filled tires on the cutting arm 20. Guard means 90 comprise a generally U-shaped securing bracket 94 or other suitable securing means mounted on support arm 28. The guard 92 extends across and adjacent to the circumference of tire 34a such that its shorter leg extends downwardly with its lower surface 96 positioned immediately above the lower half of the blade 38. Since the blade is rotated such that its top half travels away from the tower and the lower half therefore returns toward the tower (which directions are shown by the arrows in FIGS. 1 and 7), branches and other trimmings cut from trees, hedges, or other plants trimmed with the trimming apparatus 10 are drawn toward the guard means 90 by the lower portion of the blade. Since the guard is immediately adjacent the blade, the branches and other trimmings are forced away from the blade when they contact the guard. Thus, the cuttings fall in a neat row adjacent the wheels 14 on the side of the apparatus including the cutting arm as shown in FIG. 1. Time and expense involved in recovering the cuttings and trimmings is therefore significantly reduced since those trimmings are piled in a single row along the path of the apparatus.

Figure 4:
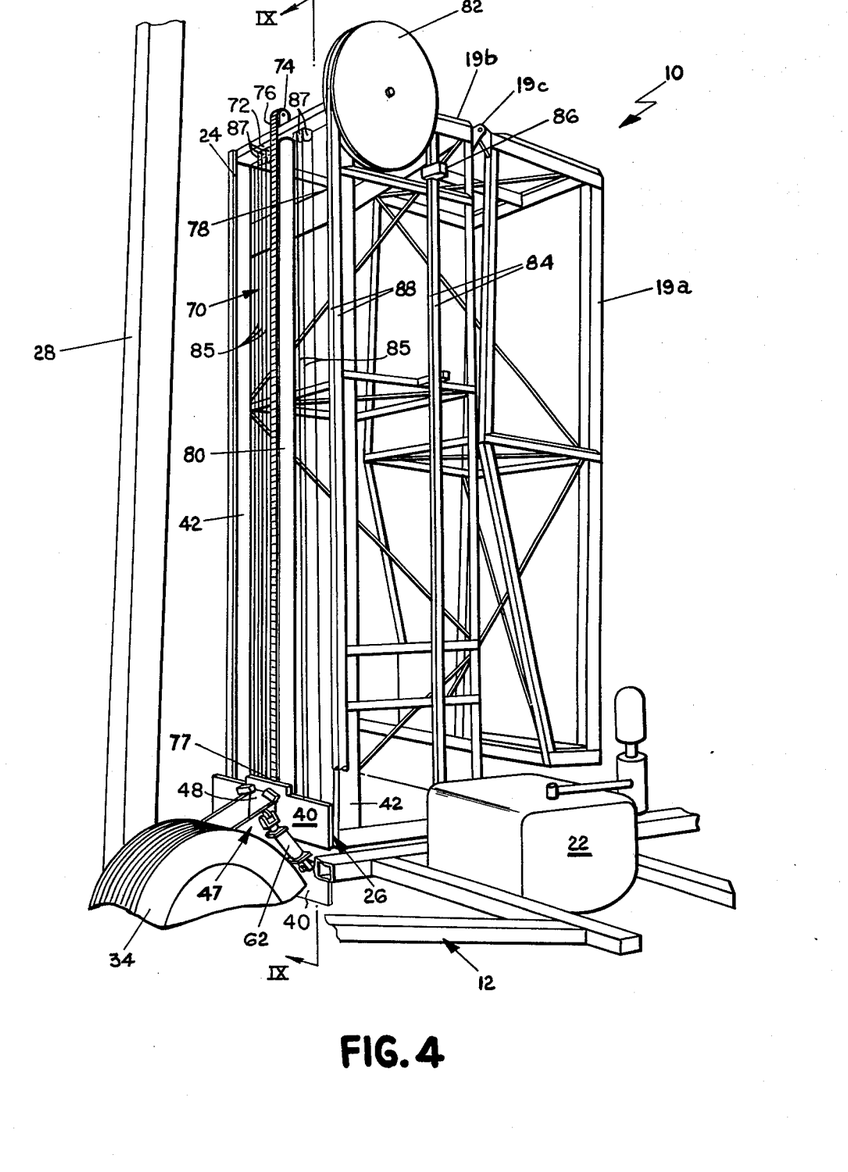
FIG. 4 is an enlarged fragmentary, perspective view of the lower portion of the tower of the trimming apparatus illustrating the extendible means for raising and lowering the cutting arm, the upper portion of the tower being shown in its folded and stored positions.

Referring now to FIGS. 4–6, cantilever support 26 includes upper and lower sets of cross members 40 (see FIG. 6). Cross members 40 extend horizontally between the generally coplanar exterior surfaces of channel members 42 which form the corner posts along side 24 of tower 18. As will be seen from FIGS. 5–6, channel members 42 are positioned such that the spaced flanges of each extend toward one another. Extending perpendicularly between the cross members 40 adjacent the out edge surfaces of the flanges of channel members 42 are plates 44. Plates 44 include blocks 46 secured thereto such that they are disposed within the adjacent channels 42 between the flanges thereof and are movable longitudinally along channel members 42. Accordingly, the entire cantilever support 26 can be moved vertically relative to inwardly facing channels which serve as a guide for such vertical motion.

A rotatable extension 47 forms a portion of support 26 and includes a plate 48 extending generally vertically between the exterior cross members 40 as seen in FIGS. 4–6. Triangular plates 50 and 52 extend normally outwardly from plate 48. A plate 54 is secured along the bottom edges of plates 50 and 52. Extension 47 is pivotally secured via plate 48 to the lowermost outer cross member 40 by a shaft 56 and suitable bearings 57 (see FIG. 5). Plate 48 has a radiused or partially arcuate upper edge 58 which is slidably secured under spaced flanges 59 on securing blocks 60. Blocks 60 each include a flange which extends over the curved edge of plate 48 to hold plate 48 approximately parallel to the planes of cross members 40 while allowing that plate, and extension 47, to rotate about shaft 56. Each block is spaced in an arc along the outer surface of upper outermost cross member 40. Accordingly, extension 47, formed by plates 48, 50, 52, and 54, may be rotated as a unit about shaft 56 between the positions shown in solid and phantom in FIG. 6 while the upper edge 58 of plate 48 is retained against the cross members 40 by securing blocks 60 extending thereover. When cutting arm 20 is pivotally secured to extension 47 as explained below, extension 47 and arm 20 may be rotated as a unit. The axis of rotation is generally normal to the side 24 of tower 18, i.e., generally horizontal and transverse to the intended direction of motion of the machine 10. In the preferred embodiment, the maximum angle of rotation is approximately 45° (FIG. 2), although rotation through a greater angle may be provided.

Power means are included to provide rotation of extension 47 and arm 20 and include a two-way fluid pressure cylinder 62 mounted on one side of the cantilever support 26 on support block 63 which is secured to one of the cross members 40 with a piston rod 64 pivotally secured to the outside of plate 52 (FIG. 5). Normally, cylinder 62 and rod 64 hold extension 47 in a fixed rotational position. When hydraulic fluid is introduced into cylinder 62, rod 64 is extended or retracted causing the arm 20 and extension 47 to rotate about shaft 56 in the desired direction shown in FIGS. 5 and 6.

As is best seen in FIG. 3, the end 29 of support member 28 of arm 20 is pivotally secured to the ends of triangular plates 50 and 52 such that the entire arm 20 may be pivoted toward and away from tower 18. When extension 47 is oriented vertically as shown in solid in FIG. 6, the arm may be pivoted in a generally vertical plane extending generally transverse of the direction of motion of the apparatus 10. When extension 47 is rotated out of its vertical position, arm 20 is pivoted on a pivot hinge about end 29 in a plane inclined to the vertical at an angle corresponding to the angle of rotation of extension 47. In the preferred embodiment, the maximum pivot angle A in FIG. 3 about end 29 is approximately 90° regardless of the rotational position of extension 47. As will be apparent to those skilled in the art, other means may be included to provide a pivot angle about end 29 of more than 90°.

Hydraulic or other fluid means are also included on support 26 to pivot support arm 28 about its pivot hinge on end 29. These means include a two-way fluid cylinder 66 having an extendible piston rod 68 (FIGS. 3 and 5) pivotally secured above the pivot point of end 29. When rod 68 is extended, the arm 20 is pivoted vertically away from the tower 18 and vice versa. Such extension of the arm 20 thereby inclines the blade 38 at an upward angle in a plane which is generally transverse to the inclined plane in which the blade is positioned via rotation of the arm about point 56. That is, extension of arm 20 via cylinder 66 inclines blade 38 at an upward angle A with respect to the horizontal rotational axis defined by shaft 56 on extension 47 (see FIG. 3). Regardless of the magnitude of this angle, the arm 20 and blade 38 may be rotated via extension 47 and shaft 56 to change the angle of attack of the cutting teeth. Rotation of the arm through 45° when the angle A is less than 90° thereby causes the blade to trace the surface of approximately ¼ of a cone.

Accordingly, at any single vertical position of the cantilever support 26 along side 24 of tower 18, the entire cutting arm 20 may be selectively pivoted vertically and/or rotated to selectively position the blade 28 in either one or both of two upwardly extending angles.

Figure 9:
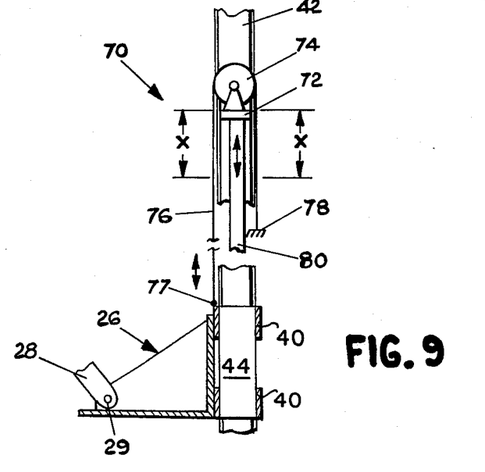
FIG. 9 is a fragmentary, sectional illustration of the extendible means for raising and lowering the cutting arm taken along plane IX—IX of FIG. 4.

As shown in FIGS. 4 and 9, the cantilever support 26 and cutting arm 20 are raised and lowered as a unit along side 24 of tower 18 by vertically extendible means 70. Extendible means 70 include a cross arm 72 having ends which fit inside the vertically extending channels of channel members 42 in a manner similar to blocks 46. Cross arm 72 includes a toothed pulley or gear wheel 74 rotatably mounted thereon and supporting a flexible roller chain 76. Roller chain 76 is secured at one end at 77 by welding, bolts, or other securing means to the cantilever support 26 and at its opposite end to a fixed position 78 within the framework of tower 18 and on the opposite side of cross arm 72. Supporting the cross arm 72, and extending generally vertically between the framework 12 and the underside of arm 72, is a hydraulically actuated, vertically extendible support post 80. As is shown in FIG. 9, when the support post 80 is hydraulically extended upwardly a distance represented by X, the roller chain 76 is forced to roll over toothed gear or pulley 74 as the cross arm is lifted. Since the amount of roller chain 76 necessary to allow the cross arm 72 and post 80 to move upwardly a distance X is equal to X on each side of the arm (see FIG. 9), and since the end 78 is fixed and the opposite end 77 is attached to the vertically slidable cantilever support 26, the upward movement of cross arm 72 a distance X moves the cantilever support and cutting arm upwardly a distance X + X or 2X. Accordingly, for every vertical movement of the extendible post 80 and cross arm 72, the cantilever support 26 as well as the attached cutting arm 20 will be caused to move in the same direction a distance twice the distance moved by the cross arm. Thus, in order to raise the cantilever support 26 it is necessary only to move the cross arm 72 from the midpoint of the tower (its lowermost position as shown in FIG. 4) to the top of the tower, i.e., along the upper one-half of the tower. As explained above, movement of cross arm 72 along the upper half of the tower will cause a corresponding vertical movement of the cantilever support 26 from its very bottom position (shown in FIG. 4) to the very top (shown in phantom in FIG. 3).

In order to transmit hydraulic fluid to the various hydraulic cylinders and motors on the cutting arm 20, a rotatable pulley 82 is secured to one end of the cross arm 72 and is moved vertically therewith. Rigid hydraulic conduits 84 extend upwardly to a fluid coupling 86 which is positioned adjacent the lowermost position of the pulley 82, i.e., approximately one-half way along the height of the tower. Extending from the upper side of the fluid coupling 86 are flexible hydraulic conduits or hoses 88 extending around the outer circumference of the pulley 82 and downwardly to a fluid coupling 89 (FIG. 5) on cantilever support 26. The fluid is distributed from coupling 89 via other conduits to hydraulic motor 39. Other hydraulic conduits 85 extend from hydraulic pump and engine 22 upwardly around pulleys 87 and downwardly to the cylinders 62, 66 on support 26 as it is moved to its various vertical positions along the tower. Accordingly, as the cantilever support 26 is raised via the extendible means 70 in the manner described above, the flexible hydraulic conduits 85 and 88 roll over pulleys 82 and 87 which are raised by arm 72 with the extendible means (see FIG. 3). Hydraulic pressure is therefore supplied at all positions of the cantilever support without fouling of the supply lines.

Figure 8:
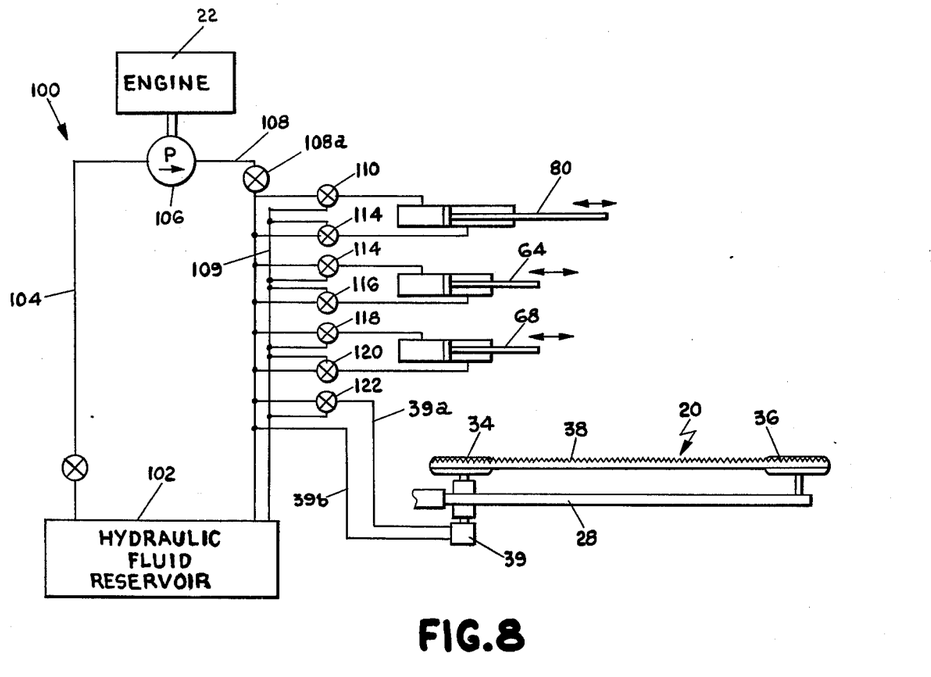
FIG. 8 is a schematic illustration of the hydraulic power means used to control the operation of the trimming apparatus.

As shown in FIG. 8, the apparatus 10 includes a hydraulic system 100 for controlling the operation and maneuvering of the cutting arm 20. System 100 includes a hydraulic fluid reservoir 102 connected via a conduit 104 to a pump 106 powered by engine 22. Pump 106 places the fluid under pressure and forces it through conduit 108 to the various position control cylinders 64, 68, and 80 for the cutting arm as well as the hydraulic drive motor 39 for driving the wheels and blade on that arm. The vertically extendible support post 80 is controlled via manually controllable valves 110 and 112 in lines leading to opposite ends of a fluid cylinder for that support post. Similarly, fluid cylinders 64 and 68, which respectively control the rotation and pivotal movement of the cutting arm, include valves 114, 116, and 118, 120 respectively, in lines leading to opposite ends of those cylinders. Valves 110 through 120 may be selectively opened and closed via controls connected to a tractor or other vehicle towing the trimming apparatus in order to control the extension and retraction of the rods 64, 68, or 80 and thus movement of the cutting arm. In addition, a valve 122 is included in the supply line 39a leading to hydraulic motor 39 such that rotational operation of the saw blade 38 may be controlled by opening and closing the valve from the tractor. Another line 109 is also connected to the lines leading to the various cylinders so that line 108 may be used as a supply line and line 109 as an exhaust depending on the position of valve 108a as well as valves 110–122.

As will now be understood, the present invention provides a highly maneuverable cutting arm 20 which may be raised and lowered, rotated, and pivoted in order to position it for trimming and hedging. The arm includes a highly efficient, continuously rotating, saw blade 38 which draws the trimmings and cuttings to a position where they are piled together adjacent the path of travel of the apparatus. Moreover, the cutting arm 20 includes no bulky or heavy mechanical assembly or linkage necessary to operate a cutting apparatus, but only continuous blade 38, a single drive wheel 34 at its inner end and a single idler wheel 36 at its outer end. Therefore the cutting arm is relatively light in weight and may be made substantially longer than previously known cutting arms. Accordingly, the reduced weight of the present cutting arm not only facilitates its maneuverability but provides access to more areas of the trees, hedges, or plants to be trimmed because of its greater length.

While several forms of the invention have been shown and described, other forms will now be apparent to those skilled in the art. Therefore, it will be understood that the embodiments shown in the drawings and described above are merely for illustrative purposes, and are not intended to limit the scope of the invention which is defined by the claims which follow.

The embodiments of the invention in which an exclusive property or privilege is claimed are defined as follows.

1. A trimming apparatus for trees, hedges, and the like comprising:
   a framework;
   ground-supported means for supporting said framework for movement over the ground;
   an upstanding tower mounted on said framework;
   a variably positionable trimming means on said tower;
   support means on said tower for mounting said trimming means for generally vertical movement along said tower;
   said trimming means including
   a support arm,
   flexible, resilient, drive means and flexible, resilient, idler means spaced apart on said support arm for supporting a continuous, band-type saw blade,
   a continuous, band-type saw blade mounted on said drive and idler means, said blade being substantially unsupported intermediate said drive and idler means, and
   means on said support arm for rotating said blade in a closed path about said drive and idler means;
   said trimming apparatus also including pivot means between said support means and support arm for pivoting said arm toward and away from said tower about a first axis which is longitudinally disposed in the intended direction of movement of the apparatus, and rotation means on said support means for rotating said support arm about a predetermined second axis generally transverse to the intended direction of movement of the apparatus; said pivot means and rotation means allowing the cutting edge of said saw blade to be variously inclined for cutting and trimming.

2. The trimming apparatus of claim 1 wherein said trimming means is mounted on said tower in a cantilevered fashion; said pivot means including means for pivoting said arm about said first axis through approximately 90° generally between horizontal and vertical positions; said rotation means including means for rotating said arm through approximately 45° generally about said second axis, said second axis extending generally horizontally and laterally of said tower.

3. The trimming apparatus of claim 2 wherein said apparatus is intended to be moved in a predetermined direction of motion; said trimming means being mounted on a lateral side of said tower such that it extends generally transverse to said direction of motion; said saw blade including cutting teeth extending generally toward said intended direction of motion; said support means including a support slidably mounted on said lateral side of said tower; said support including a rotatable portion; said pivot means including means for pivotally mounting said support arm on said rotatable portion.

4. The trimming apparatus of claim 1 wherein said support include a support slidably mounted on one lateral side of said tower; power means for moving said support from the bottom to the top of said tower; said power means including extendible lifting means connected to said support and movable along the approximate upper one-half of said tower to move said support along the entire height of the tower.

5. The trimming apparatus of claim 4 wherein said tower includes at least two corner posts comprising channel members extending from the bottom to the top of said tower; said support including means for guiding the sliding movement thereof along said channel members; said extendible lifting means including a cross member guided for sliding movement by the interior of said channel members, hydraulic means for moving said cross member, and pulley means mounted atop said cross member; said pulley means including an elongated flexible connector attached at one end to said support and at the other end to said tower whereby movement of said cross arm through a first vertical distance causes vertical movement of said support through a second distance approximately twice said first distance.

6. The trimming apparatus of claim 5 wherein said extendible lifting means includes pulley means for rotatably guiding flexible hydraulic fluid lines extending to said support.

7. The trimming apparatus of claim 6 wherein said support includes a frame slidably mounted below said cross member and between said channel member corner posts, said frame including guide blocks fitted within the channels of said posts to guide sliding vertical movement thereof, and an extending platform rotatably mounted on and extending outwardly from said support frame on a support shaft defining said second axis; and a pair of fluid cylinder means, one cylinder connected between said support frame and platform for rotating said platform and trimming means about said second axis, and the second cylinder connected between said platform and trimming means for pivoting said trimming means about said first axis.

8. The trimming apparatus of claim 4 wherein said pivot means and rotation means include hydraulic cylinders on said support for pivoting and rotating said support arm about said first and second axes respectively.

9. The trimming apparatus of claim 1 wherein said support means include a support slidably mounted for movement along said tower and power means for moving said support, said trimming means mounted on and extending from said support; said power means including extendible lifting means mounted for movement along the top one-half of said tower and elongated, flexible connecting means for lifting said support, said flexible connecting means having one end fixed to said tower on one side of said lifting means and one end secured to said support on the other side of said lifting means and extending over said extendible lifting means intermediate said ends, said lifting means including a rotatable support for supporting said flexible connecting means thereon; said extendible lifting means causing said support to move approximately twice as far as said extendible lifting means when said extendible lifting means is moved.

10. The trimming apparatus of claim 1 wherein said tower includes at least upper and lower portions and hinge means for joining said upper and lower portions whereby said upper tower portion may be folded downwardly against said lower portion for storage.

11. The trimming apparatus of claim 1 wherein said flexible, resilient, drive and idler means include annular, circumferential surfaces thereon for supporting said saw blade and means on said circumferential surfaces for maintaining said saw blade centered on said surfaces thereof and for resisting lateral movement of said blade off said drive and idler means during operation.

12. The trimming apparatus of claim 1 wherein said drive and idler means comprise flexible, resilient, circular, fluid-filled tires each having a plurality of treads extending around their outer circumference.

13. The trimming apparatus of claim 1 wherein said support arm includes guard means disposed adjacent one end thereof for causing the trimmings cut from said trimmings, hedges, or the like to fall in a row.

14. An apparatus for trimming trees, hedges, and the like comprising an upstanding tower; ground-supported frame means for supporting said tower for movement over the ground; a cantilever cutting arm; support means mounted for movement on said tower for supporting the arm such that said arm extends from said tower, said cutting arm including a cutting blade; drive means on said cutting arm for actuating said cutting blade; pivot and rotation means between said support means and cutting arm for pivoting and rotating said cutting arm with respect to said support means and said tower whereby said cutting blade may be selectively inclined in two upward directions; extendible lifting means mounted on tower and connected to said support means for causing said support means and cutting arm to move through a generally vertical distance which is approximately twice any vertical distance moved by said extendible lifting means.

15. The apparatus of claim 14 wherein said cutting arm includes a support member, a pair of spaced, rotatable pulleys on said support member, at least one of said pulleys including a flexible, resilient, circular, blade-supporting means, a continuous, band-type saw blade mounted for movement on said pulleys, and means for rotating said blade in a closed path on said pulleys.

16. The apparatus of claim 15 wherein said drive means for actuating said cutting blade include a hydraulic motor for rotating said pulley and blade in a closed path.

17. The apparatus of claim 15 wherein each of said pulleys on said support member includes a fluid-filled tire for supporting the blade, said tires including a plurality of annular treads spaced across their outer circumference.

18. The apparatus of claim 15 wherein said cutting arm includes guard means disposed adjacent the pulley closest to said tower for causing the trimmings cut from said trimmings, hedges, or the like to fall in a row adjacent the path of travel of said apparatus.

19. The apparatus of claim 14 wherein said extendible lifting means include a support member slidably mounted on said tower and supporting said cutting arm, a cross member supported by a vertically extendible, hydraulically powered post, a pulley rotatably mounted on said cross member and rotatably supporting a flexible connector having one end secured to said support member and one end secured to said tower whereby vertical movement of said extendible arm and cross member causes said connector to lift said support member by forcing said connector over said pulley.

20. The apparatus of claim 14 wherein said extendible lifting means include a support member slidably mounted on said tower; said support member including a rotatable portion on which said cutting arm is pivotally mounted and power means for pivoting said arm with respect to said rotatable portion and for rotating said rotatable portion and cutting arm together as a unit with respect to said tower.

21. The apparatus of claim 20 wherein said support member includes means for mounting said rotatable portion for rotation through approximately 45° about a generally horizontal axis and means for pivoting said cutting arm through approximately 90° with respect to said rotatable portions.

22. A hedger for trimming trees, hedges, and the like comprising trimming means for trimming the trees, hedges, and the like, upstanding support means for supporting said trimming means and ground-supported frame means for movably supporting said support means and trimming means above the ground, said support means including movable positioning means on said support means for moving said trimming means and for positioning said saw blade on said trimming means at various positions with respect to said frame means, ground and, thus, the tree, hedge, or the like to be trimmed; said trimming means including a support arm, at least two rotatable pulley means for supporting a closed-loop saw blade therearound and mounting means rotatably mounting said pulley means at spaced locations along said support arm for supporting said pulley means; a continuous, band-type saw blade mounted on and extending around said pulley means, said blade being substantially unsupported intermediate said pulley means, said pulley means each including a flexible, resilient member for supporting said blade, and drive means on said trimming means for driving said saw blade in a closed path on said pulley means.

23. The hedger of claim 22 wherein said pulley means each include at least one fluid-filled member having an outer circumference; said saw blade being supported on said outer circumferences.

24. The hedger of claim 23 wherein said fluid-filled members are pneumatic tires mounted on rims; said rims being rotatably mounted on said support member.

25. The hedger of claim 22 wherein said drive means includes a motor and a drive shaft, said shaft being connected to one of said pulley means for driving said saw blade about said pulley means.

26. The hedger of claim 22 wherein said ground-supported frame means includes means for supporting said frame means for movement over the ground; said support means including an upstanding tower; said movable positioning means being mounted for movement along said tower.

27. The hedger of claim 26 wherein said movable positioning means include means for extending said trimming means toward and away from said tower and means for rotating said trimming means with respect to said tower.

* * * * *